US010512851B1

(12) United States Patent
Almejalli (10) Patent No.: US 10,512,851 B1
(45) Date of Patent: Dec. 24, 2019

(54) DOLL WITH SIMULATED HAIR AND NAIL GROWTH (71) Applicant: Awrad A. A. M. A. Almejalli, Safat (KW)

(72) Inventor: Awrad A. A. M. A. Almejalli, Safat (KW)

( * ) Notice: Subject to any disclaimer, the term of this patent is extended or adjusted under 35 U.S.C. 154(b) by 0 days.

(21) Appl. No.: 16/565,429

(22) Filed: Sep. 9, 2019

(51) Int. Cl.
A63H 3/44 (2006.01)
G09B 19/00 (2006.01)

(52) U.S. Cl.
CPC ........... *A63H 3/44* (2013.01); *G09B 19/0076* (2013.01)

(58) Field of Classification Search
CPC ........... A63H 3/44; A45D 44/14; A45D 44/00
See application file for complete search history.

(56) References Cited

U.S. PATENT DOCUMENTS

| 3,032,923 | A |   | 5/1962  | Von Sternberg |           |
|-----------|---|---|---------|---------------|-----------|
| 3,162,976 | A | * | 12/1964 | Beebe         | A63H 3/44 |
|           |   |   |         |               | 446/319   |
| 3,535,818 | A | * | 10/1970 | Witold        | A63H 3/48 |
|           |   |   |         |               | 446/339   |
| 3,670,451 | A |   | 6/1972  | Groves et al. |           |
| 3,691,679 | A | * | 9/1972  | Kersten       | A63H 3/36 |
|           |   |   |         |               | 446/320   |
| 3,694,957 | A |   | 10/1972 | Houghton      |           |
| 3,696,551 | A | * | 10/1972 | Sklarsky      | A63H 3/44 |
|           |   |   |         |               | 446/319   |
| 3,696,552 | A | * | 10/1972 | Gunther       | A63H 3/44 |
|           |   |   |         |               | 446/319   |
| 3,698,134 | A | * | 10/1972 | Amici         | A63H 3/44 |
|           |   |   |         |               | 446/319   |
| 3,704,542 | A | * | 12/1972 | Suchowski     | A63H 3/44 |
|           |   |   |         |               | 446/319   |
| 3,808,736 | A | * | 5/1974  | Terzian       | A45D 44/14|
|           |   |   |         |               | 446/296   |
| 3,834,071 | A | * | 9/1974  | Terzian       | A63H 3/44 |
|           |   |   |         |               | 446/353   |
| 4,170,085 | A | * | 10/1979 | Luke          | A63H 3/44 |
|           |   |   |         |               | 446/319   |
| 4,403,442 | A | * | 9/1983  | Blanco        | A63H 3/36 |
|           |   |   |         |               | 434/267   |
| 4,801,286 | A | * | 1/1989  | Orenstein     | A63H 3/44 |
|           |   |   |         |               | 446/319   |

(Continued)

*Primary Examiner* — Eugene L Kim
*Assistant Examiner* — Christopher Glenn
(74) *Attorney, Agent, or Firm* — Richard C. Litman; Nath, Goldberg & Meyer (57) ABSTRACT

The doll with simulated hair and nail growth includes a doll head with adjustable length hair simulating hair growth, and at least one doll hand having adjustable length fingernails, simulating nail growth. The simulated hair and nail growth are each metered, allowing the doll to be used for educational purposes to show growth of a certain length within a particular period of time. The doll head includes an internal axle, about which simulated hair fibers are wound. Selective rotation of the axle, driven by selective rotation of a knob with metered indicia, allows the apparent length of the simulated hair fibers to be adjusted in a controlled and metered fashion. The doll hand is provided with an internal sliding cartridge with simulated fingernails. Sliding of the cartridge, also in a controlled and metered fashion, allows for adjustable extension of the fingernails from fingers of the doll hand.

13 Claims, 5 Drawing Sheets

(56) References Cited

U.S. PATENT DOCUMENTS

| | | | | |
|---|---|---|---|---|
| 4,917,647 A * | 4/1990 | Wetherell | ................. | A63H 3/44 |
| | | | | 446/268 |
| 5,116,277 A * | 5/1992 | Kelley | .................... | A63H 3/44 |
| | | | | 446/296 |
| 5,149,288 A * | 9/1992 | Kelley | .................... | A63H 3/44 |
| | | | | 446/319 |
| 5,586,696 A * | 12/1996 | Martinez | ................ | A45D 44/14 |
| | | | | 132/53 |
| 6,139,397 A * | 10/2000 | Blau | ........................ | A63H 3/44 |
| | | | | 446/319 |
| 7,063,590 B2 | 6/2006 | Ferrigno | | |
| 2006/0063468 A1* | 3/2006 | Ferrigno | ................ | A63H 3/001 |
| | | | | 446/319 |

\* cited by examiner

DOLL WITH SIMULATED HAIR AND NAIL GROWTH

BACKGROUND

1. Field

The disclosure of the present patent application relates to educational toys, and particularly to a doll with simulated hair and nail growth for teaching young girls the basics of hair care and care of fingernails and toenails.

2. Description of the Related Art

Traditionally, dolls have been a favorite toy for young girls. It has been thought that dolls foster a nurturing instinct in girls at an early age, as well as providing an imaginary friend and a sense of security. Parents, grandparents, and other caregivers and concerned individuals often spend a considerable amount of time searching for exactly the right doll for the young girl on their shopping list.

It is generally considered desirable to instill a proper sense of personal grooming in young girls at an early age, including both hair care and nail care. Proper hair care and nail care may each entail trimming hair and nails to suitable length, cleaning hair and nails, coloring hair and nails with dyes and nail polish, and fashioning hair and nails with appropriate hair-dos or decoration. A doll that could be used to teach the importance of such grooming skills would be beneficial. Thus, a doll with simulated hair and nail growth solving the aforementioned problems is desired.

SUMMARY

The doll with simulated hair and nail growth includes a doll head with adjustable length hair, simulating hair growth, and at least one doll hand having adjustable length nails, simulating nail growth. The simulated hair and nail growth are each metered, allowing the doll to be used for educational purposes to show growth of a certain length within a particular period of time. The doll head includes an at least partially hollow doll head having an opening formed therethrough. An axle is received within the at least partially hollow doll head, such that a first end of the axle is rotationally mounted to an inner wall of the at least partially hollow doll head. A knob is mounted on a second end of the axle. The knob is axially adjustable to be selectively received by an aperture formed through the at least partially hollow doll head.

First ends of a plurality of simulated hair fibers are mounted on the axle, for selective spooling and unspooling thereabout, and second ends of the plurality of simulated hair fibers project through the opening formed through the at least partially hollow doll head. Selective rotation of the axle caused by selective rotation of the knob selectively adjusts the length of the plurality of simulated hair fibers extending through the opening.

The at least one doll hand includes an at least partially hollow housing simulating a hand having a plurality of fingers. A plurality of apertures are formed through the at least partially hollow housing at locations corresponding to respective tips of the plurality of fingers. A fingernail cartridge is slidably mounted within the at least partially hollow housing. The fingernail cartridge includes a sliding bar and a plurality of fingernail members. The sliding bar has longitudinally opposed first and second ends, such that the first end is slidably mounted within the at least partially hollow housing, and such that the second end projects through a slot formed in the at least partially hollow housing. Each of the fingernail members has opposed free and fixed ends. The fixed ends are secured to the sliding bar and the free ends at least partially project through the plurality of apertures formed through the at least partially hollow housing. Selective sliding adjustment of the second end of the sliding bar selectively adjusts lengths of the plurality of nail members extending from the plurality of fingers. It should be understood that the same mechanism for nail growth may be applied to a second hand of the doll and/or may be applied to one or more doll feet, thus simulating toenail growth.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
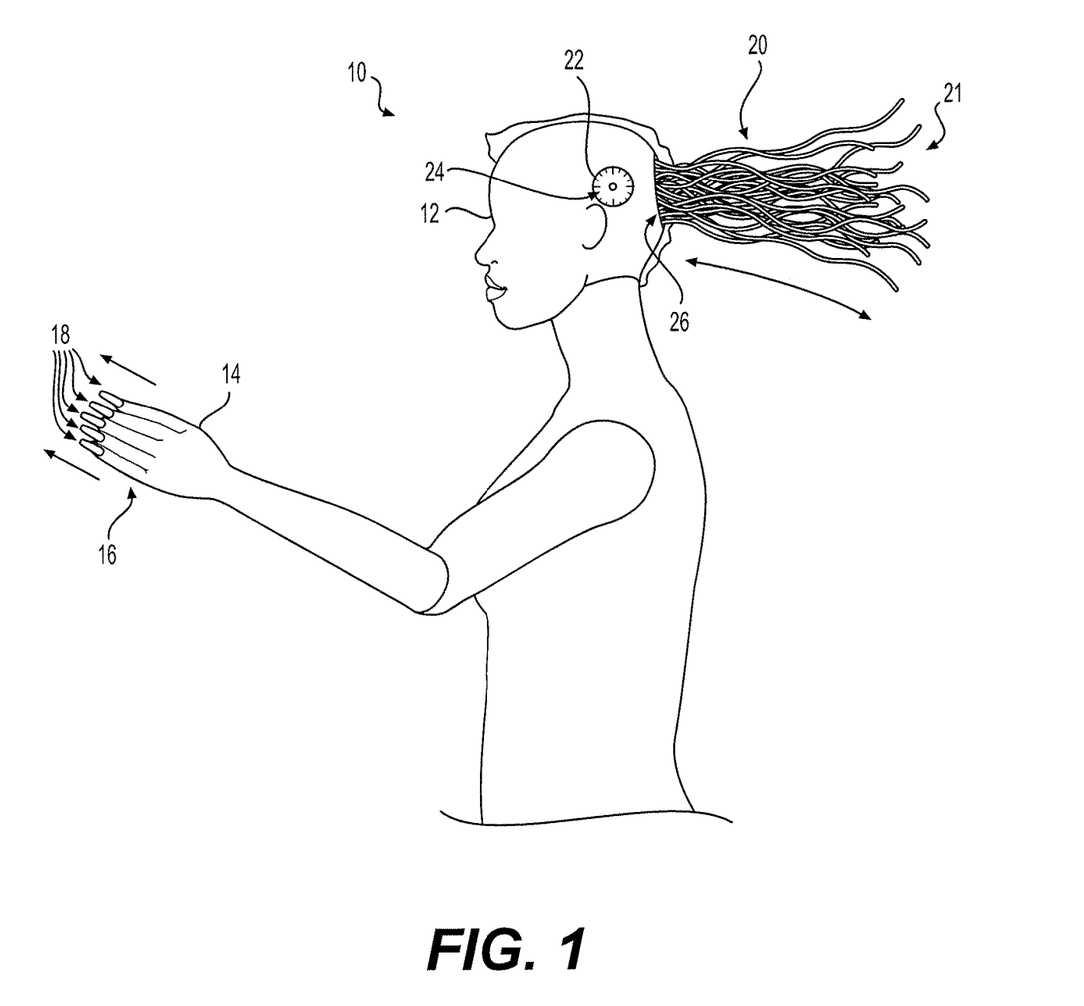
FIG. 1 is a partial side view of a doll with simulated hair and nail growth.

Referring to FIG. 1, the doll with simulated hair and nail growth 10 includes a doll head 12 with some adjustable length hair 20 simulating hair growth, and at least one doll hand 14 having adjustable length fingernails 18, simulating nail growth. The simulated hair and nail growth are each metered, allowing the doll 10 to be used for educational purposes to show growth of a certain length within a particular period of time. It should be understood that the overall appearance of doll 10 in FIG. 1 is shown for exemplary purposes only. It should be further understood that single hand 14 is shown in FIG. 1 for purposes of simplification and illustration, and that doll 10 may be provided with a second hand, which may also have simulated nail growth, operating in a similar manner to that of hand 14. It will also be understood that the doll's head 12 may be capped by other, fixed length simulated hair, which has been omitted from the drawing for clarity in explaining the portion of the doll's hair that has adjustable length for simulating hair growth.

Figure 2:
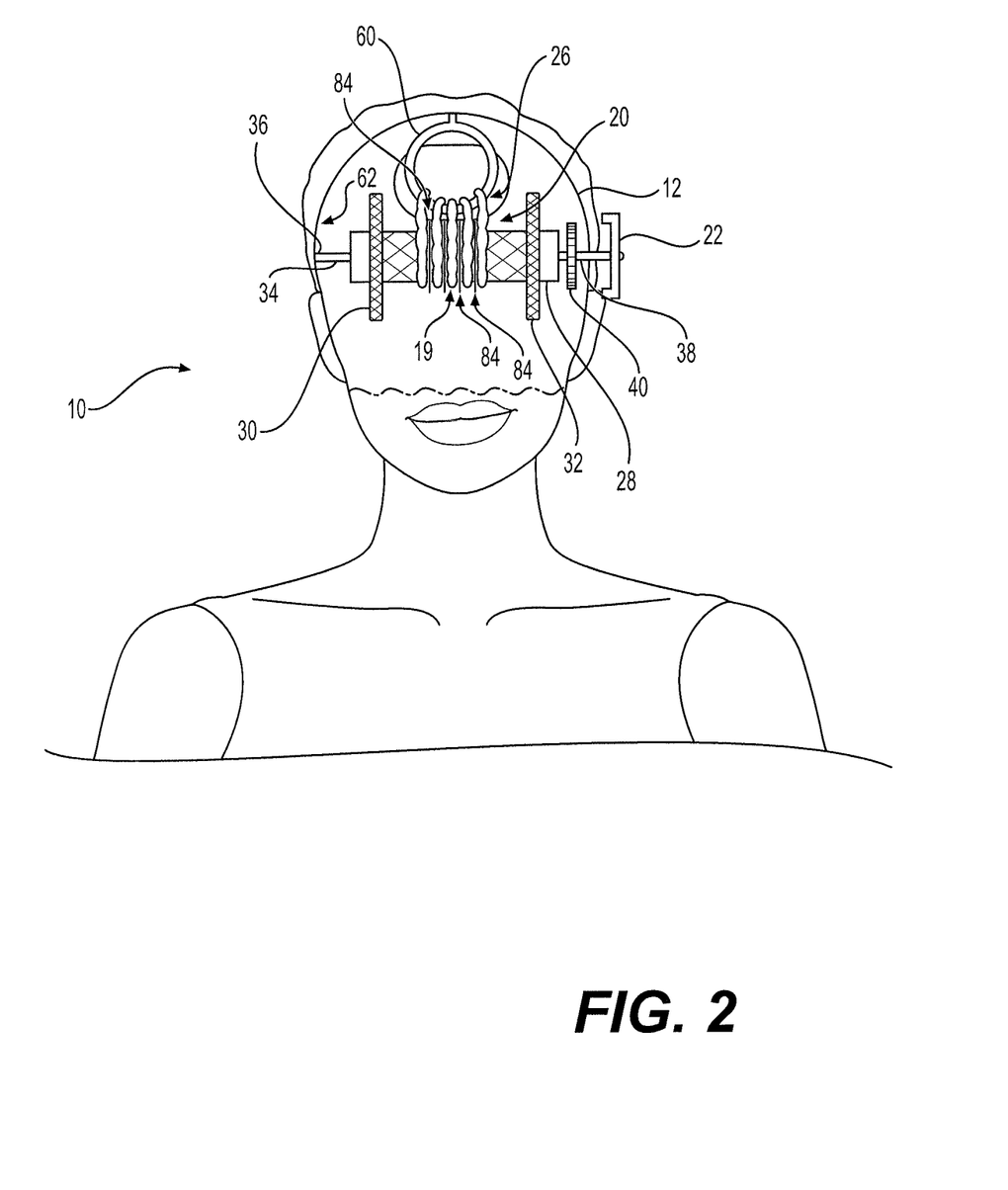
FIG. 2 is a front view of a doll head of the doll of FIG. 1, shown with the head broken away to show the mechanism for adjusting hair length.

As shown in FIG. 2, the doll head 12 is at least partially hollow and has an opening 26 formed therein. Although the opening 26 is shown in the rear of the doll head 12, it should be understood that the positioning of the opening 26 may be varied, depending upon the desired location of apparent hair growth. An axle 34 is mounted within the at least partially hollow doll head 12, such that a first end 36 of the axle 34 is rotationally mounted to an inner wall 62 of the at least partially hollow doll head 12. It should be understood that any suitable type of rotational mounting may be used to mount first end 36 to the inner wall 62. A knob 22 is mounted on a second end 38 of the axle 34. The knob 22 is axially adjustable to be selectively received in an aperture 44 (shown in FIG. 3B) formed through the at least partially hollow doll head 12.

Figure 3A:
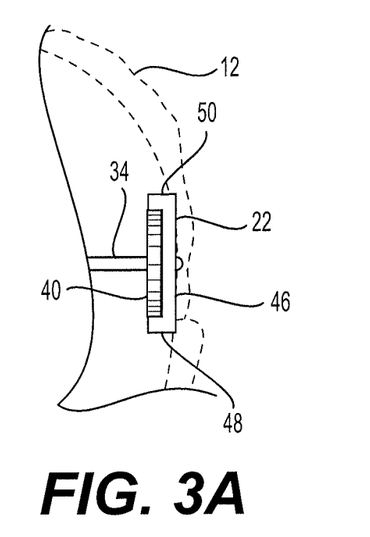
FIG. 3A is a partial front view of the doll of FIG. 2, showing details of a portion of the mechanism for adjusting hair length of FIG. 2, as shown in a first configuration.
Figure 3B:
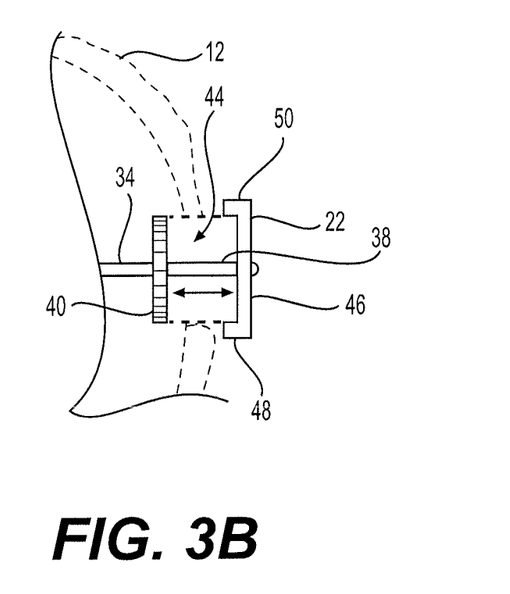
FIG. 3B is a partial front view of the doll of FIG. 2, showing details of the portion of the mechanism for adjusting hair length shown in FIG. 3A, but shown in a second configuration.

As shown in FIGS. 2, 3A and 3B, a gear 40 may be mounted on the axle 34 adjacent the second end 38. As best seen in FIG. 3B, the knob 22 may include a disc-shaped plate 46 and a pair of diametrically opposed prongs 48, 50 extending from the plate 46. In the disengaged position of FIG. 3B, the knob 22 is external to the aperture 44 and may be freely rotated. As shown in FIG. 1, the knob 22 may have metering indicia 24 formed on s face thereof, indicating certain simulated time periods. For example, when the knob 22 is rotated to elongate the simulated hair fibers 20, a 180° rotation of knob 22, for example, may represent one month of hair growth (as indicated by indicia 24), with approximately two centimeters of hair 20 apparently "growing" from the doll head 12 (average monthly hair growth being estimated as two centimeters). It should be understood that the indicia 24 may be divided into any desired periods of time.

When the knob 22 is pushed into the aperture 44, as shown in FIG. 3A, the user is no longer free to grasp and easily rotate the knob 22, and the prongs 48, 50 engage the gear 40. The gear 40 may be, for example, a conventional circular spur gear, and the prongs 48, 50 may fit between adjacent teeth thereof, thus selectively locking rotation of the gear 40 and the axle 34 with respect to the knob 22. The knob 22 may be specially contoured or otherwise configured to lock in place with respect to the doll head 12, thus preventing any adjustment of the length of hair fibers 20 when the knob 22 is in the locked position of FIG. 3A. As noted above, the knob 22 is axially adjustable to be selectively received by the aperture 44, allowing movement between the positions of FIG. 3A and FIG. 3B. It should be understood that this axial movement may be accomplished in any suitable manner. For example, the axle 34 may be telescopic, or the second end 38 of the axle 34 may extend through the plate 46 of the knob 22, allowing the knob 22 to slide axially thereon.

Returning to FIGS. 1 and 2, the first ends 19 of the plurality of simulated hair fibers 20 are mounted on the axle 34 for selective spooling and unspooling about the axle 34, and the second ends 21 of the plurality of simulated hair fibers 20 may project through the opening 26 formed through the at least partially hollow doll head 12. It should be understood that the thickness, texture and overall appearance of the hair fibers 20 are shown for exemplary purposes only and may be varied. The simulated hair fibers 20 may be made from nylon, for example, or any other suitable material. As shown in FIG. 2, intermediate plates or separator discs 84 may be provided for separating individual bundles or braids of the hair fibers 20, thus preventing internal tangling.

Selective rotation of the axle 34 caused by selective rotation of the knob 22 selectively adjusts the length of the plurality of simulated hair fibers 20 extending through the opening 26. A guide ring 60 may be mounted within the at least partially hollow doll head 12 adjacent the opening 26 for supporting and guiding the plurality of simulated hair fibers 20 between the axle 34 and the opening 26.

As shown in FIG. 2, a roller 28 may be mounted on the axle 34, allowing the plurality of simulated hair fibers 20 to be at least partially wrapped around the roller 28, rather than being directly secured to the axle 34. The roller 28 may be provided with a pair of flanges 30, 32, such that the first ends 19 of the plurality of simulated hair fibers 20 are positioned therebetween, thus preventing internal tangling or jamming of the simulated hair fibers 20 with the ends 36, 38 of the axle 34, or with gear 40.

Figure 4A:
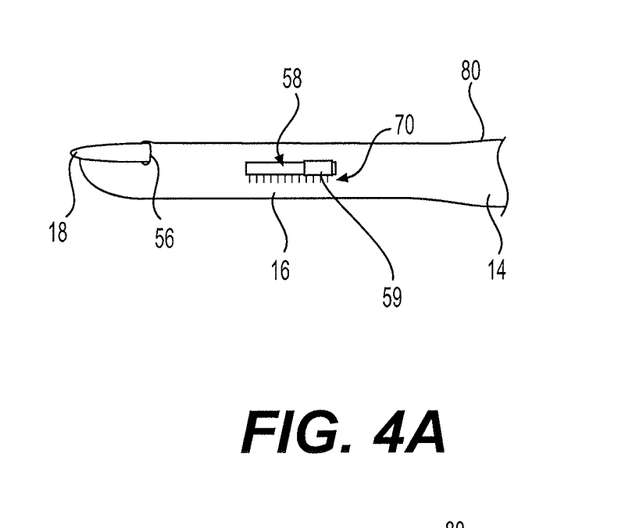
FIG. 4A is a side view of the doll hand of the doll with simulated hair and nail growth of FIG. 1, shown with the fingernails in a first position.
Figure 4B:
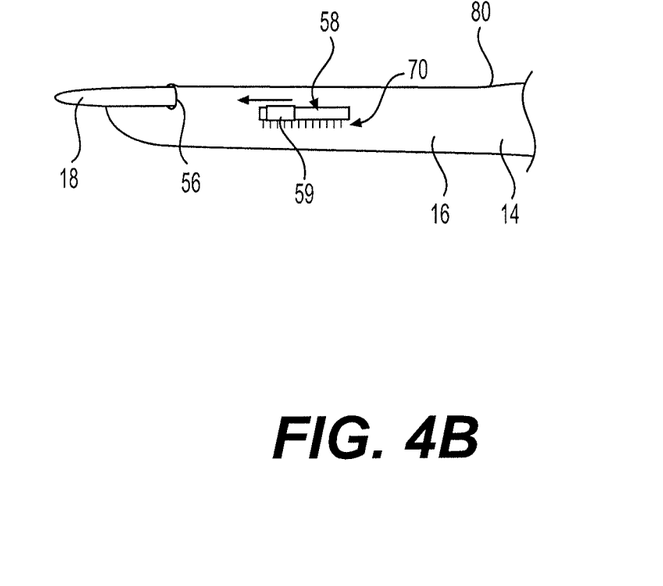
FIG. 4B is a side view of the doll hand of FIG. 4A, shown with the fingernails extended to a second position, simulating fingernail growth.

As shown in FIGS. 1, 4A and 4B, the at least one doll hand 14 includes an at least partially hollow housing 80 simulating a hand having a plurality of fingers 16. Although five such fingers, simulating a typical human hand, are shown, it should be understood that the number and overall appearance of the fingers 16 and hand 14 are shown for exemplary purposes only and may be varied.

Figure 5:
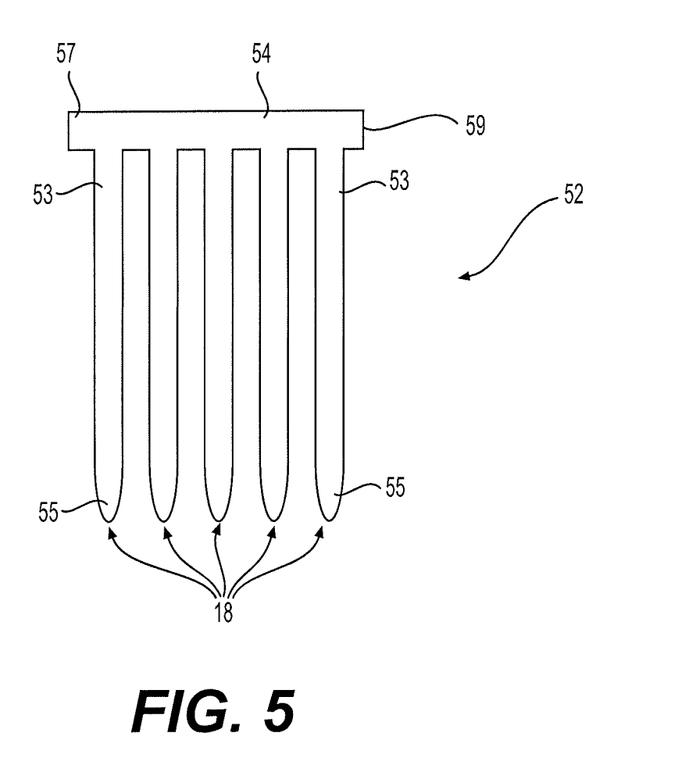
FIG. 5 is a top view of a fingernail cartridge of the doll hand of FIGS. 4A and 4B.

A plurality of apertures 56 are formed through the at least partially hollow housing 80 at locations corresponding to respective tips of the plurality of fingers 16. A fingernail cartridge 52 (shown in FIG. 5) is slidably mounted within the at least partially hollow housing 80. The fingernail cartridge 52 includes a sliding bar 54 and a plurality of nail members 18. The sliding bar 54 has longitudinally opposed first and second ends 57, 59, respectively, such that the first end 57 is slidably mounted within the at least partially hollow housing 80, and such that the second end 59 projects through a slot 58 formed in the at least partially hollow housing 80.

Each of the nail members 18 has opposed fixed and free ends 53, 55, respectively. The fixed ends 53 extend from the sliding bar 54 and the free ends 55 at least partially project through the plurality of apertures 56 formed through the at least partially hollow housing 80. As illustrated in FIGS. 4A and 4B, selective sliding adjustment of the second end 59 of the sliding bar 54 selectively adjusts the length of the plurality of nail members 18 extending from the plurality of fingers 16. The nail members 18 may be formed from a relatively light plastic material, allowing the nail members 18 to be cut. When the nail members 18 have been fully cut, the at least partially hollow housing 80 may be opened for replacement with a new nail cartridge 52. It should be understood that the same mechanism for nail growth may be applied to a second hand of the doll and/or may be applied to one or more doll feet, thus simulating toenail growth.

As shown in FIGS. 4A and 4B, metering indicia 70 may be formed on the hand 14 adjacent the slot 58, allowing the simulated nail growth to be metered and controlled, similar to the metering of hair 20 described above. The indicia 70 may mark out a simulated month, allowing the second end 59 to be slid accordingly. The nail members 18 may then extend, for example, an additional 3.5 mm, simulating average human nail growth of 3.5 mm per month.

It is to be understood that the doll with simulated hair and nail growth are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:
1. A doll with simulated hair growth, comprising:
an at least partially hollow doll head having an opening therein and an inner wall;

an axle mounted within the at least partially hollow doll head, the axle having axially opposed first and second ends, the first end thereof being rotationally mounted on the inner wall of the doll head, the doll head having an aperture defined therein opposite the rotationally mounted first end of the axle, the second end of the axle extending through the aperture;

a knob mounted on the second end of the axle, the knob being axially adjustable to be selectively secured in the aperture formed through the at least partially hollow doll head; and a plurality of simulated hair fibers each having opposed first and second ends, the first ends of the hair fibers being mounted on the axle and the second ends the hair fibers extending through the opening formed through the doll head, the simulated hair fibers being partially wound about the axle so that the knob may be pulled from the aperture and used to rotate the axle to selectively adjust how far the second ends of the simulated hair fibers extend through the opening in the doll head, thereby adjusting length of the simulated hair fibers extending from the doll head to simulate hair growth.

2. The doll as recited in claim 1, further comprising a roller mounted on the axle, the plurality of simulated hair fibers being at least partially wound on the roller.

3. The doll as recited in claim 2, wherein the roller comprises a pair of spaced flanges, the first ends of the simulated hair fibers being positioned between the spaced flanges.

4. The doll as recited in claim 1, further comprising a gear mounted adjacent the second end of the axle, at least one prong of the knob selectively engaging the gear to selectively lock rotation of the gear and the axle with the knob, the knob being free spinning when disengaged from the aperture in the doll head and the prongs disengaged from the gear.

5. The doll as recited in claim 1, further comprising a guide ring mounted within the at least partially hollow doll head adjacent the opening, the guide ring supporting and guiding the simulated hair fibers between the axle and the opening.

6. The doll as recited in claim 1, wherein the knob has metering indicia formed thereon calibrated to increment the length of the simulated hair fibers extending through the opening in the doll head according to rotation of the knob through a corresponding angle.

7. A doll with simulated nail growth, comprising:
an at least partially hollow housing simulating a doll's hand having a plurality of fingers, the housing having a plurality of fingertip apertures defined therein at locations corresponding to tips of the fingers and having a slot defined therein; and a fingernail cartridge slidably mounted within the housing, the fingernail cartridge having:
an elongate sliding bar having opposed first and second ends, the first end being slidably mounted within the housing, the second end projecting through the slot defined in the housing; and a plurality of fingernail members having opposed free and fixed ends, the fixed ends of the fingernail members being fixed to the sliding bar, the free ends at least partially extending through the fingertip apertures;

wherein selective sliding adjustment of the second end of the sliding bar selectively adjusts how far the fingernail members extend from the fingers, thereby simulating nail growth.

8. A doll with simulated hair and nail growth, comprising:
a doll head including:
an at least partially hollow doll head having an opening therein and an inner wall;

an axle mounted within the at least partially hollow doll head, the axle having axially opposed first and second ends, the first end thereof being rotationally mounted on the inner wall of the doll head, the doll head having an aperture defined therein opposite the rotationally mounted first end of the axle, the second end of the axle extending through the aperture;

a knob mounted on the second end of the axle, the knob being axially adjustable to be selectively secured in the aperture formed through the at least partially hollow doll head; and a plurality of simulated hair fibers each having opposed first and second ends, the first ends of the hair fibers being mounted on the axle and the second ends the hair fibers extending through the opening formed through the doll head, the simulated hair fibers being partially wound about the axle so that the knob may be pulled from the aperture and used to rotate the axle to selectively adjust how far the second ends of the simulated hair fibers extend through the opening in the doll head, thereby adjusting length of the simulated hair fibers extending from the doll head to simulate hair growth; and a doll hand including:
an at least partially hollow housing simulating a doll's hand having a plurality of fingers, the housing having a plurality of fingertip apertures defined therein at locations corresponding to tips of the fingers and having a slot defined therein; and a fingernail cartridge slidably mounted within the housing, the fingernail cartridge having:
an elongate sliding bar having opposed first and second ends, the first end being slidably mounted within the housing, the second end projecting through the slot defined in the housing; and a plurality of fingernail members having opposed free and fixed ends, the fixed ends of the fingernail members being fixed to the sliding bar, the free ends at least partially extending through the fingertip apertures;

wherein selective sliding adjustment of the second end of the sliding bar selectively adjusts how far the fingernail members extend from the fingers, thereby simulating nail growth.

9. The doll as recited in claim 8, further comprising a roller mounted on the axle, the plurality of simulated hair fibers being at least partially wound on the roller.

10. The doll as recited in claim 9, wherein the roller comprises a pair of spaced flanges, the first ends of the simulated hair fibers being positioned between the spaced flanges.

11. The doll as recited in claim 8, further comprising a gear mounted adjacent the second end of the axle, at least one prong of the knob selectively engaging the gear to selectively lock rotation of the gear and the axle with the knob, the knob being free spinning when disengaged from the aperture in the doll head and the prongs disengaged from the gear.

12. The doll as recited in claim 8, further comprising a guide ring mounted within the at least partially hollow doll head adjacent the opening, the guide ring supporting and guiding the simulated hair fibers between the axle and the opening.

13. The doll as recited in claim 8, wherein the knob has metering indicia formed thereon calibrated to increment the length of the simulated hair fibers extending through the opening in the doll head according to rotation of the knob through a corresponding angle.

\* \* \* \* \*